(No Model.)

M. G. HUBBARD.
GLEANER AND BINDER.

No. 258,231.  Patented May 23, 1882.

Attests
L. J. Matos
Jas. F. Donahue,

Inventor
Moses G. Hubbard
By his atty

UNITED STATES PATENT OFFICE.

MOSES G. HUBBARD, OF NORRISTOWN, PENNSYLVANIA.

GLEANER AND BINDER.

SPECIFICATION forming part of Letters Patent No. 258,231, dated May 23, 1882.

Application filed February 3, 1882. (No model.)

*To all whom it may concern:*

Be it known that I, MOSES G. HUBBARD, of Norristown, in the county of Montgomery and State of Pennsylvania, have invented an Improvement in Gleaners and Binders, of which the following is a specification.

My invention has reference to gleaners and binders, but more particularly to the gleaning device; and it consists in arranging the gleaning-teeth and their hubs in pairs, and supporting between said gleaning toothed wheels stationary plates, which partly encircle the shaft; further, in securing upon said plate, and upon each side thereof, an additional narrow scroll which presses against the ascending teeth of the gleaning-cylinder and cleans it of all straw and prevents it drawing straw from the gavel which is being elevated, all of which is more fully set out in the following specification, and shown in the accompanying drawings, which form part thereof.

Figure 1:
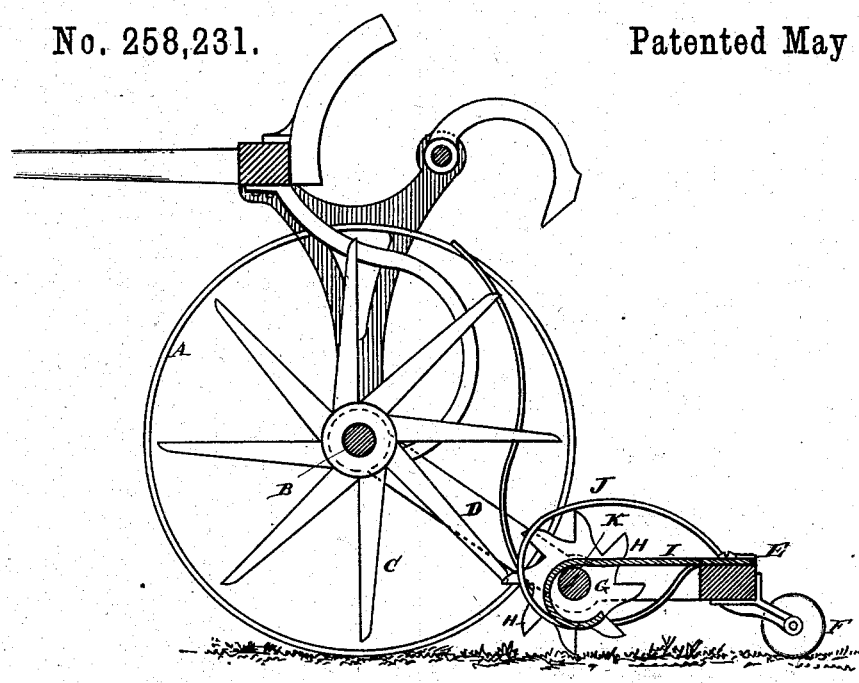
Figure 2:
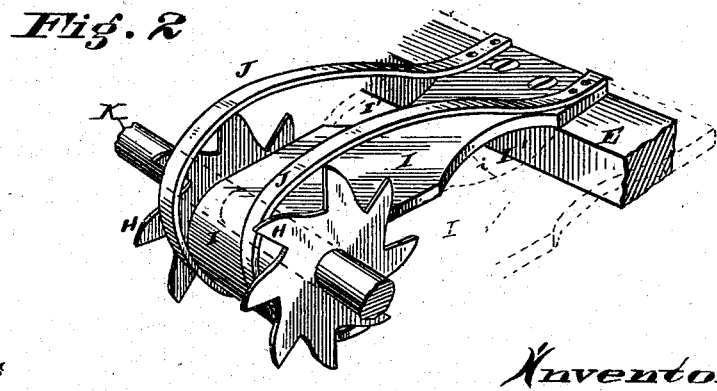

In the drawings, Figure 1 is a sectional side elevation of a gleaner and binder having my improvements attached thereto, and Fig. 2 is a perspective view of a portion of the gleaning-cylinder.

A is the driving-wheel. B is the driving-shaft. C is the elevating-cylinder. E is the trailing-frame, and is pivoted to axle or shaft B by bars or arms D, and is supported at the rear by wheels F. G is the gleaning-cylinder, and consists of a shaft, K, upon which is secured a number of wheels having teeth or arms H radiating from the center. These wheels are arranged two and two, and between them is a curved plate or scroll, I, which is secured to the frame E, and nearly encircles the gleaner-shaft K. Secured upon this plate I, and starting from the front and near the bottom, are scrolls J, which are narrow and are adapted to springing action against the teeth of the gleaning-cylinder, which run upon either side of plate I and close to it. As the gleaning-cylinder rotates it picks up the grain strewn upon the ground, and lifts it up and delivers it to the elevating-cylinder C. Any loose straw which may stick to the teeth or arms H is pushed off as they pass the gradually-ascending scrolls J, which clean said loose grain or straw off the teeth and deliver it out of the way of the rotating shaft, and the plate I prevents any of said straw getting between the scrolls and their gleaning arms, and also keeps the scrolls J pressed constantly against the teeth.

By this device there is no possibility of straw being wrapped about the shaft of the gleaning-cylinder to interfere with its working.

If desired, the scrolls J may be rigid, and the teeth of the gleaning-cylinder be made flexible and press against said scrolls.

The notches *i* form openings I' when the plates I are placed side by side upon either side of the teeth H, and allow the loose straw to be thrown off and clear of the scrolls.

Having now described my invention, what I claim as new, and desire to secure by Letters Patent, is—

1. The combination of the revolving gleaning-cylinder, having a series of hubs provided with radial arms secured thereon, with a stationary plate or scroll arranged between every pair of hubs, partly encircling the shaft and filling the space between said hubs, substantially as and for the purpose specified.

2. The combination of the long curved scrolls J, extending over in front of the gleaning-cylinder, and beginning near its axle and back toward the trailing-frame, with a curved support for said scrolls, secured at one end to the trailing-frame and having its other end free, and the gleaner arms or sprockets, substantially as and for the purpose specified.

3. The gleaner-cylinder, in combination with plate or scroll I, rigidly secured to the trailing-frame and partly encircling the gleaner-shaft, and arranged between two adjacent gleaning-hubs, and scrolls J, firmly secured to said plate I in front at a point below the center of said gleaning-shaft, substantially as and for the purpose specified.

4. The gleaning sprockets or teeth, in combination with curved plates I, having notches *i*, which, when two plates are placed side by side on opposite sides of the gleaner-teeth H, form openings I', substantially as shown.

In testimony of which invention I hereunto set my hand.

MOSES G. HUBBARD.

Witnesses:
R. S. CHILD, Jr.,
R. M. HUNTER.